Dec. 7, 1965      C. R. MATHESON      3,221,897
LOAD-LIFTING APPARATUS
Filed July 10, 1962      3 Sheets-Sheet 1

INVENTOR.
CHESTER R. MATHESON
BY
Fetherstonhaugh & Co.
ATTORNEYS

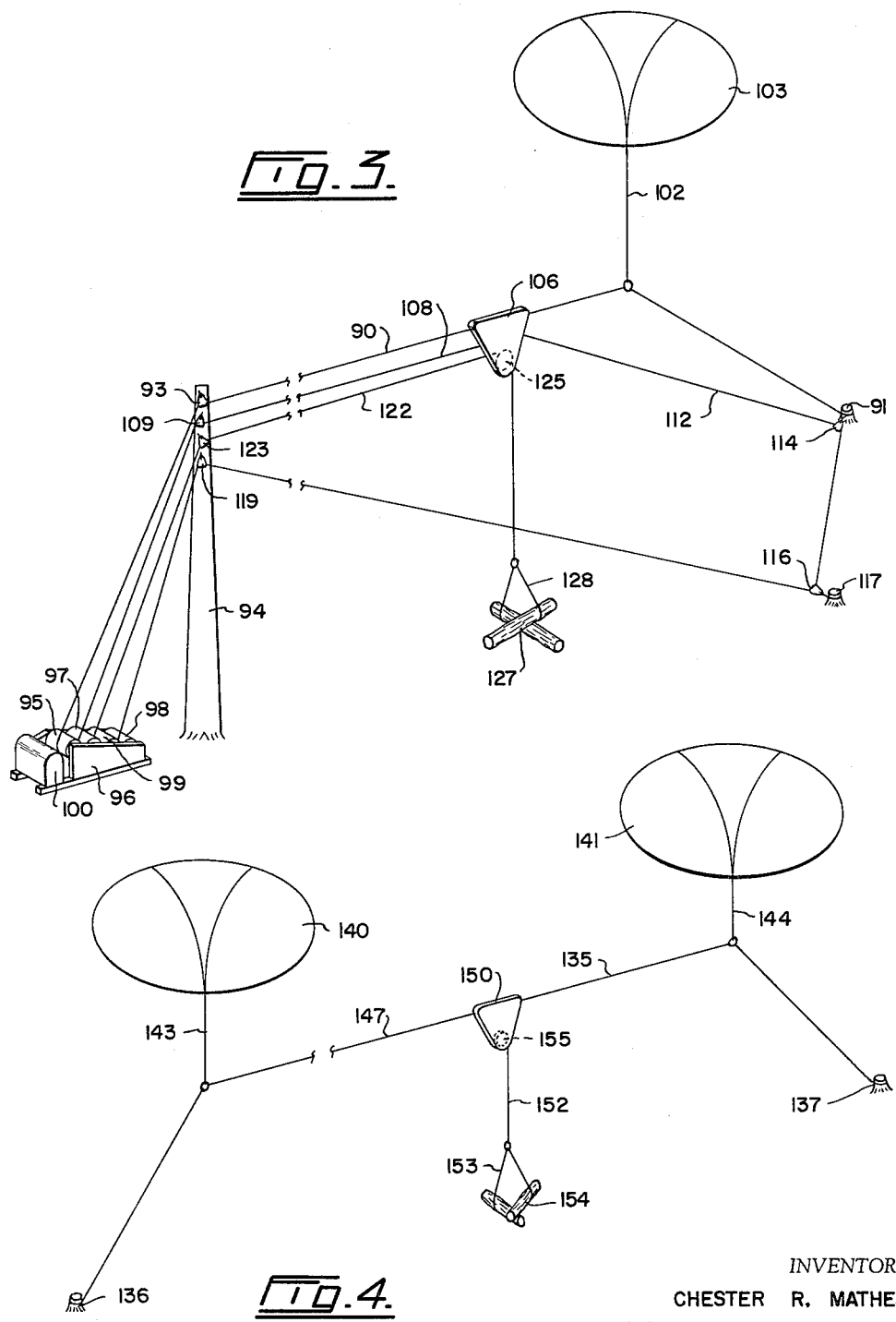

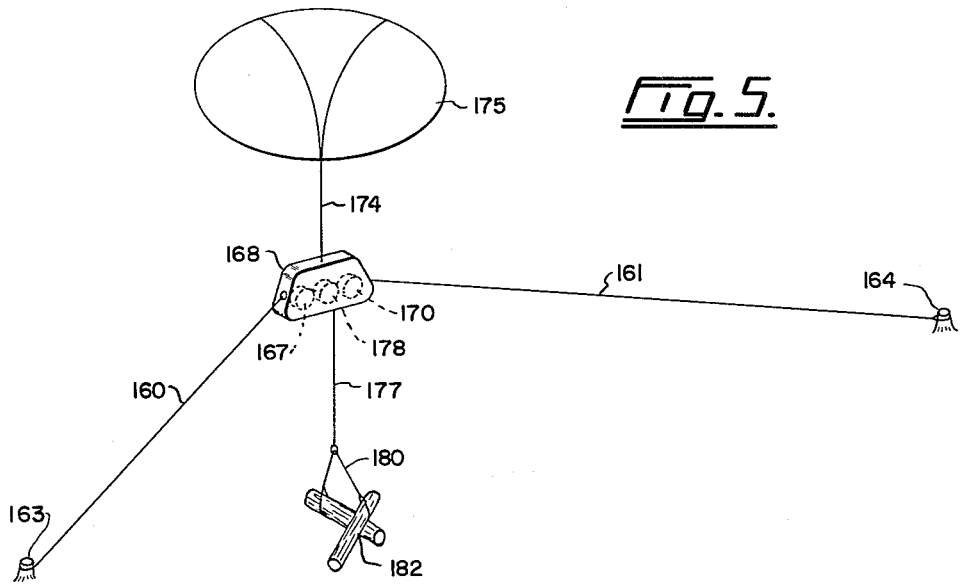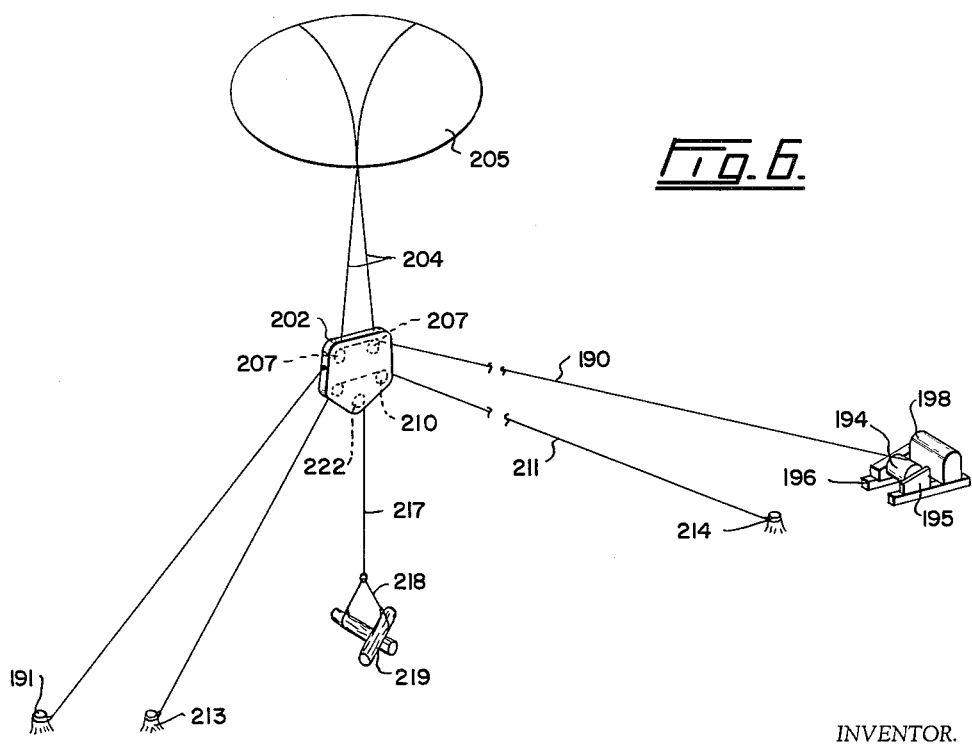

United States Patent Office 3,221,897
Patented Dec. 7, 1965

3,221,897
LOAD-LIFTING APPARATUS
Chester R. Matheson, 1150 W. 41st Ave., Vancouver,
British Columbia, Canada
Filed July 10, 1962, Ser. No. 208,837
19 Claims. (Cl. 212—71)

This invention relates to load-lifting apparatus which is particularly useful in logging operations, but which may be used for lifting or moving loads in other fields, such as construction, mining, quarrying, and the like.

This invention is particularly useful in logging where logs are cut in a certain area and lifted or drawn to a central point. Once the area is cleared, it is necessary to dismantle the equipment, move it to another location, and then to set it up for further operation. Customarily the cables or lines have to be very strong and heavy in order to carry or drag the logs to the central point, and this makes the equipment very expensive and difficult to move through and handle in the woods. This invention makes it possible to use much lighter lines and equipment than have heretofore been used, with the resulting saving in cost and ease of movement through the woods. Furthermore, this apparatus makes it possible to operate in locations where it is difficult to set up the standard equipment.

It is very difficult to move heavy loads through fairly long distances with equipment that is not set up for permanent operation. For example, in logging, single logs or bundles of logs are moved several hundred yards by equipment that has to be moved to different locations, usually over rough terrain. A line, usually called a skyline, is rigged up between spars spaced some distance apart. A carriage is moved back and forth along the skyline by cables connected to opposite sides thereof, and one or more lines extend from the carriage, each being secured to one or more logs. With this arrangement, the skyline has to be heavy and strong enough to support the full weight of the logs or the strain if the logs are dragged along the ground. The skyline has to be very strong in order to support its own weight over the span between the spars. As a result of this, the spars themselves have to be substantial and very well supported by guy lines. The strain of the skyline alone between the spars is enormous, and the load on the spars can be imagined when you add the weight of a heavy skyline carriage, the long lines connected to the carriage for moving it back and forth over the skyline, and the weight of the logs being lifted or dragged towards one of the spars.

Conventional equipment requires the cables used in carrying the load to be supported every so often by intermediate spars or trees or other means after the practical limit of a single span is reached. This invention eliminates the necessity of such support and enables the moving of cable supported loads over a much longer distance without any intermediate support. Furthermore, the present equipment makes it possible to carry or draw logs an indeterminate distance by means of cables regardless of the topography encountered.

Load-lifting apparatus according to the present invention includes a lighter-than-air craft which is of a size sufficient to take most or all of the weight of the logs being lifted or dragged over the ground. In addition, the craft can carry at least some of the weight of the lines and cables involved, thereby greatly reducing the strain on any spars that may be used. One of the advantages of this apparatus is that cable means may extend over a great distance with most thereof lying on the ground, in which case, the craft lifts only a portion of the cable means at any time.

This load-lifting apparatus basically comprises cable means, means connecting the ends of the cable means to the ground at spaced-apart points, a lighter-than-air craft secured to said cable means and lifting at least part of it off the ground, and means for moving a load suspended from the cable means and at least partially carried by said craft in a direction longitudinally of the cable. One or both of the ends of the cable may be anchored to the ground, or one or both ends of the cable may be wound on power-operated drums. The term "ground" as used herein is intended to include any surface over which the apparatus operates. For example, it may for some purposes operate over flooring, or even over water, in which case, the cable ends may be secured to banks at the water edge or to boats, floats or the like on the water.

There are two main forms of the invention. In one main form, the cable is moved longitudinally thereof, and the lighter-than-air craft secured thereto moves with it, the load usually being directly or indirectly connected to the cable near the craft. In the other main form, the cable is maintained in an elevated position by one or more lighter-than-air craft, and suitable means, such as a carriage, is mounted for movement on the cable and moved therealong, the load being secured to this carriage or other means. The carriage may be moved by one or more cables, or it may be self-propelled.

Although this apparatus is particularly designed for moving logs, and it is so described herein, it is to be kept in mind that it may be used for moving other loads in different fields.

Examples of this invention are illustrated in the accompanying drawings, in which:

FIGURE 3 is a diagrammatic view of an alternative form of apparatus, FIGURE 4 is a diagrammatic form of another alternative form of apparatus, FIGURE 5 is a diagrammatic view of still another alternative form of load-lifting apparatus, and FIGURE 6 is a diagrammatic view of yet another alternative.

Figure 1:
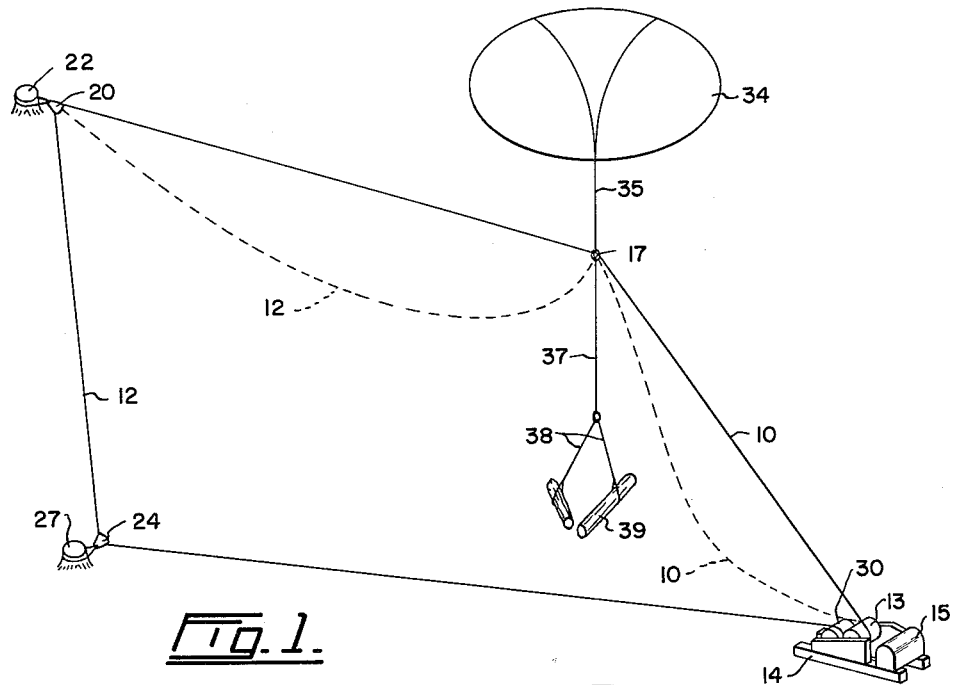
FIGURE 1 is a diagrammatic view of one form of load-lifting apparatus.

Referring to FIGURE 1 of the drawings, the load-lifting apparatus comprises cable means in the form of a main line 10 and a haulback line 12. One end of main line 10 is secured to the ground by being wound on to a drum 13 of a winch mounted on a sled 14. This drum forms part of a winch which includes a source of power, such as an internal combustion engine 15. The other end of line 10 is connected at 17 to an end of haulback line 12. This haulback line is connected to the ground by means of a pulley 20 through which it extends, said pulley being anchored to suitable means, such as a stump 22. Line 12 also travels through pulleys 24 secured to stump 27 or other suitable anchor means. The opposite end of haulback line 12 is wound on a drum 30 forming part of the winch on sled 14 and driven by engine 15.

A lighter-than-air craft 34, such as a balloon or blimp, is connected by one or more cables 35 to lines 10 and 12 at 17, as shown. A tag line 37 is connected to main line 10, usually at the end 17 thereof, certainly near the connection of craft 34 to said line. Tag line 37 has connected to its lower end one or more choker lines 38, each of which is adapted to be wound around and secured to a log 39 in the usual manner.

By manipulating lines 10 and 12, craft 34 may be moved over any spot between pulley 20 and sled 14. By hauling in on both drums 13 and 30, the craft is pulled downwardly towards the ground. This makes it possible to wind the choker lines 38 around more logs 39. Then by unwinding both drums 13 and 30, craft 34 rises to lift logs 39 clear of the ground or to partially lift them off the ground, as is sometimes done in logging operations. Once the craft has reached the desired elevation, drum 13 is turned to wind main line in while drum 30 unwinds haulback line 12 to shift the logs towards the sled. During this time, craft 34 takes most or all of the load of the logs, as well as the load created by lines 10 and 12. By changing the relative speed of drums 13 and 30, craft 34, may be drawn downwardly or allowed to rise as the logs are moved towards sled 14. After the logs are released from line 37 at the desired position, drum 30 is reeled in and drum 13 turned to unwind cable 10 so that craft 34 is moved outwardly towards pulley 20.

If lines 10 and 12 are very long, portions of them extending from drum 13 and pulley 20 may lay on the ground most of the time. In this case, craft 34 lifts only the portions of lines 10 and 12 immediately below it off the ground, as indicated in broken lines in FIGURE 1.

Figure 2:
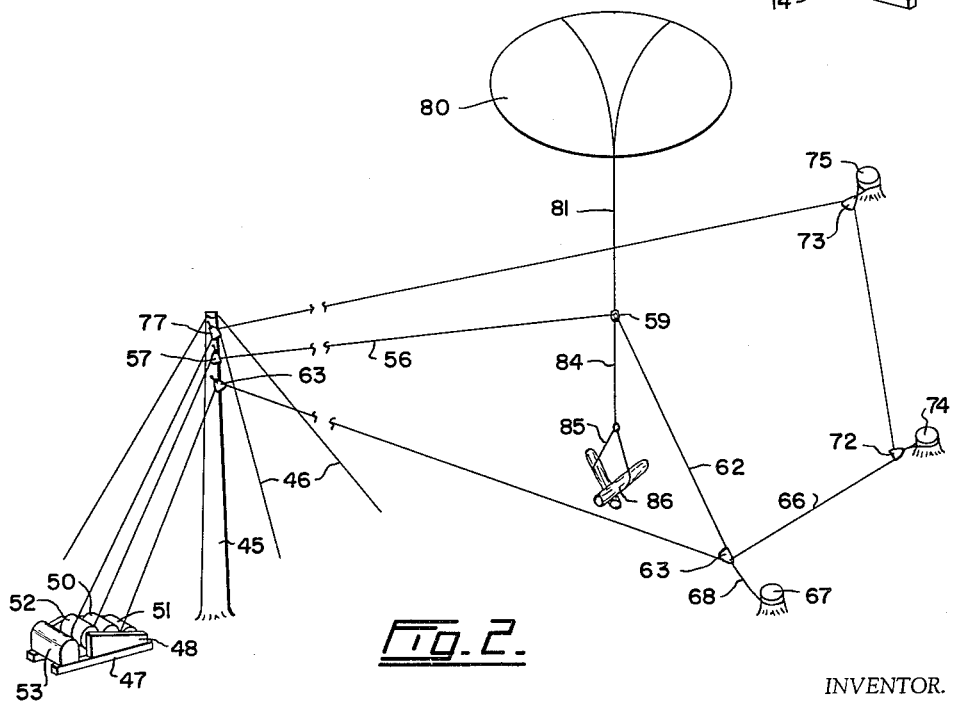
FIGURE 2 is a diagrammatic view of a variation of the apparatus shown in FIGURE 1.

FIGURE 2 illustrates a variation of the form of the invention of FIGURE 1. In this example, a spar 45 is supported by guys 46 near a sled 47 having a winch 48 thereon, said winch including drums 50, 51 and 52 operated by a motor 53. A main line 56 extends from drum 50 over pulley 57 on spar 45 and is connected at 59 to the end of a haulback line 62 which is threaded through a pulley 63 and extends back through another pulley 64 on spar 45 and is wound on to drum 51. Pulley 63 is connected to an adjusting line 66 and is also secured to a stump 67 by a short strap 68. Adjusting line 66 is threaded through pulleys 72 and 73 anchored to stumps 74 and 75, and through pulley 77 on spar 45, whence it extends to and is wound on drum 52. The release of strap 68 and the reeling in of adjusting line 66 permits the positioning of pulley 63 anywhere between spar 45 and pulley 72. As each successive position of pulley 63 is established, it is secured to the ground by strap 68 connected to a stump or other suitable anchor means.

A lighter-than-air craft 80 is connected by a cable or cables 81 to main line 56 and haulback line 62 at 59, said lines 56 and 62 constituting cable means connected at one end to the ground by pulley 63 and at the opposite end by drum 50. A tag line 84 extends down from main line 56 near craft 80 and is connected to one or more choker lines 85, each of which is adapted to be wound around a log 86.

With the arrangement of FIGURE 2, pulley 63 may be adjusted or positioned relative to spar 45 by means of adjusting line 66 and haulback line 62, and/or main line 56. Main line 56 and haulback line 62 are manipulated by means of drums 50 and 51 to shift craft 80 over any desired location between pulley 63 and spar 45, and to determine the elevation of said craft. When lines 56 and 62 are drawn in, the craft is pulled downwardly to permit a log to be connected to line 85. Then the unwinding of lines 56 and 62, or the unwinding of one of these lines without winding in the other line allows craft 80 to rise to a desired height. Then main line 56 is reeled in and haulback line 62 unwound from its drum 51 to shift the log towards spar 45.

In this example also, most of main line 56 and part of haulback line 62 between pulley 63 and connection 59 may lie on the ground with only the parts of these lines immediately below craft 80 lifted off the ground by said craft.

FIGURE 3 illustrates an alternative form of load-lifting apparatus. In this example, cable means in the form of a skyline 90 is anchored at one end to the ground by means of a stump 91, and its opposite end may extend directly to the drum of a winch, or as shown, it extends through a pulley 93 on a spar 94, after which it is wound on a drum 95 of a winch 96, said winch also having drums 97, 98 and 99 operated by a motor 100. Line 90 is connected by one or more cables 102 to a lighter-than-air craft 103, at a point spaced outwardly from spar 94. Craft 103 supports a large percentage of the weight of cable 90.

A standard skyline carriage 106 is movably mounted on skyline 90 in the usual manner, and is drawn towards spar 94 by a main line 108 which extends through a pulley 109 on the spar and is wound on drum 97. Carraige 106 is drawn outwardly from the spar by means of a haulback line 112 which is connected to the carriage and extends outwardly therefrom though a pulley 114 anchored to stump 91, through another pulley 116 anchored to a stump 117, and through a pulley 119 mounted on spar 94, the free end of said haulback line being wound on to drum 98.

The height of skyline 90 may be adjusted by winding or unwinding drum 95 to lower or raise craft 103. A load line 122 extends from drum 99 through a pulley 123 on spar 94 and through another pulley 125 on carriage 106, said line hanging down from the carriage so that one or more logs 127 may be connected thereto by one or more choker lines 128. When drum 99 is turned to wind in line 122, log 127 is drawn towards carriage 106 partially or completely off the ground. At this time, craft 103 supports a portion of the weight of the skyline, main line, haulback line, load line, carriage 106 and most or all of log 127. Carriage 106 is moved towards spar 94 by winding in lines 108 and 122 and unwinding haulback line 112. When the carriage reaches the desired position, it is held there by main line 108 and haulback line 112, and drum 99 is turned to allow line 122 to unwind therefrom, thus depositing the log on the ground. Carriage 106 is returned to its load-lifting position by reeling in drum 98 to cause haulback 112 to draw the carriage outwardly, lines 108 and 122 being permitted to unwind from their respective drums at this time.

FIGURE 4 illustrates a simple alternative form of the invention. Cable means in the form of a skyline 135 is anchored to the ground at its ends at 136 and 137. Skyline 135 may be controlled by a winch or winches, not shown, at one or both ends thereof. Two lighter-than-air craft 140 and 141 are connected to said skyline by cables 143 and 144 adjacent the opposite ends thereof to form a substantially horizontal central section 147 supported above the ground by said craft 140 and 141. A carriage 150 is movably mounted on skyline 135 between cables 143 and 144. This carriage may be self propelled, or it may be moved along line 135 by a main line and a haulback line in the same manner as carriage 106 of FIGURE 3. A load line 152 hangs down from carriage 150 and has one or more choker lines 153 connected thereto adapted to be secured to one or more logs 154. The upper end of load line 152 may be fixedly secured to carriage 150, in which case log 154 is dragged over the ground, or it may be wound on a power-operated drum 155 mounted on the carriage which is controlled in any suitable manner, such as by radio control means. Alternatively, load line 152 may be similar to load line 122 of FIGURE 3, in which case, it would extend over a pulley on carriage 150 and back to a power-operated drum located near one end of skyline 135.

The lighter-than-air craft 140 and 141 support the weight of skyline 135, carriage 150, and all or part of log 154. Actually, craft 140 and 141 eliminate the necessity of spars near the opposite ends of skyline 135.

FIGURE 5 illustrates still another alternative form of load-lifting apparatus. This apparatus includes cable means in the form of a pair of cables 160 and 161 anchored to the ground at ends 163 and 164. The opposite end of cable 160 is wound on to a drum 167 mounted on a carriage 168, while the adjacent end of line 161 is wound on another drum 170 mounted on said carriage. Power means, not shown, is mounted on carriage 168 for rotating drums 167 and 170. Carriage 168 is connected by cable 174 to a lighter-than-air craft 175 which holds the carriage and, consequently, the adjacent end of lines 160 and 161 above the ground. A load line 177 is wound on a power-operated drum 178 mounted on carriage 168 and hangs down from said carriage, although said line 177 may be fixedly secured to the carriage. One or more choker lines 180 connected to the lower end of line 177 are adapted to be connected to one or more logs 182.

Carriage 168 may be raised or lowered by reeling out or reeling in lines 160 and 161 by drums 167 and 170. When the lines are reeled out, craft 175 rises, and when said lines are reeled in, the craft is drawn downwardly. When log 182 is connected to line 180, carriage 168 is moved in one direction by reeling in line 160 on drum 167 and reeling out line 161 from drum 170, or it may be moved in the opposite direction by reeling line 161 and reeling out line 160. Carriage 168 may be designed to carry a man to control drums 167, 170 and 178, or these drums may be remotely controlled by radio means. Furthermore, cables 160 and 161 may be so long that only the parts thereof immediately below carriage 168 are lifted off the ground.

FIGURE 6 illustrates still another alternative form of the invention. Cable means in the form of a skyline 190 is anchored at one end to the ground in any suitable manner, such as by means of a stump 191, and its opposite end is wound on a drum 194 of a winch 195 mounted on a sled 196. Drum 194 is operated by an engine 198 which forms part of the winch.

A suitable skyline carriage 202 is mounted for movement along cable 190, said carriage being connected by one or more lines 204 to a lighter-than-air craft 205. This craft tends to move the carriage upwardly, and suitable restraining means, such as pulleys 207 on the carriage engage cable 190 to limit this upward movement.

In this example, carriage 202 is shifted back and forth along cable 190 by a power-operated drum 210 mounted on the carriage. A cable 211 has one or more turns around drum 210 and is anchored at its opposite end to the ground in any suitable manner, such as by means of stumps 213 and 214, said stumps being located adjacent stump 191 and sled 196, respectively.

A load line 217 is suspended from carriage 202 and has one or more choker lines 218 connected to its lower end, each of which is adapted to be wound around and connected to a log 219. The upper end of line 217 may be fixedly secured to carriage 202, but it is preferably mounted on a power-operated drum 222 on the carriage so that the load line may be reeled in or unreeled from the carriage when desired.

Craft 205 supports a percentage of the weight of lines 190 and 211, all of carriage 202 and load line 217, and part or all of the logs 219. If lines 190 and 211 are very long, parts of them may lie on the ground with only the parts thereof immediately below craft 205 lifted off the ground. The carriage, and consequently, craft 205 and logs 219 are moved along skyline 190 by turning drum 210 in the appropriate direction. Drum 194 is operated to lower and raise craft 205.

In each of the illustrated forms of the invention, one or more lighter-than-air craft carry most or all of the load of the log or logs being moved, as well as a large portion of the load of the involved equipment that is retained above the ground.

What I claim as my invention is:

1. Load-lifting apparatus comprising a cable, means connecting the ends of the cable to the ground at spaced-apart points, a lighter-than-air craft secured to said main cable and lifting at least a portion of it off the ground, a carriage movably mounted on the cable, a lifting cable passing over a pulley carried by the carriage, one end of said lifting cable being adapted to be connected to a load, power means connected to the opposite end of said lifting cable for lifting the load towards the carriage, and power means for moving the carriage along the main cable, said craft at least partially supporting the load as the carriage moves along the main cable.

2. Load-lifting apparatus comprising a cable, means connecting the ends of the cable to the ground at spaced-apart points, a lighter-than-air craft secured to said cable and lifting at least a portion of it off the ground, a carriage movably mounted on the cable, cable means connected to the carriage to move it in both directions along the cable, power means connected to the cable means for moving the carriage along the cable, said craft at least partially supporting the load as the carriage moves along the cable.

3. Load-lifting apparatus as claimed in claim 2 in which the means connecting a load to the carriage comprises a lifting cable passing over a pulley carried by the carriage, one end of said lifting cable being adapted to be connected to a load, and power means connected to the opposite end of said lifting cable for lifting the load towards the carriage.

4. Load-lifting apparatus comprising a first cable, means connecting the ends of the cable to the ground at spaced-apart points, lighter-than-air craft connected to the first cable near both ends thereof and lifting at least a portion of it off the ground, a second cable carried by the first cable and hanging downwardly relative thereto and to which a load can be attached, and power means at the cable between said craft for moving a load connected to the second cable and at least partially carried by said craft in a direction longitudinally of the first cable.

5. Load-lifting apparatus comprising a main cable, means connecting the ends of the cable to the ground at spaced-apart points, lighter-than-air craft connected to the cable near both ends thereof and lifting it off the ground, a carriage movably mounted on the main cable between said craft, a lifting cable suspended from said carriage, one end of said lifting cable being adapted to be connected to a load, power means connected to the opposite end of said lifting cable for lifting the load towards the carriage, and power means for moving the carriage along the main cable, said craft at least partially supporting the load as the carriage moves along the main cable.

6. Load-lifting apparatus comprising first and second power operated drums, a first pulley at a point remove from said drums, anchor means connected to said pulley, a cable extending from the first drum through the pulley and back to the second drum, the ends of said cable being wound on the drums, a lighter-than-air craft connected to the portion of the cable between the first drum and the pulley and lifting at least some of said portion off the ground, means for connecting a load to the cable near the craft, said craft moving with the cable and at least partially carrying the load, a third power operated drum near said first and second drums, a second pulley spaced outwardly from said drums and away from said first pulley, anchor means connected to the second pulley, a cable connected to the first pulley and extending through the second pulley and back to said third drum and wound on the latter drum.

7. Load-lifting apparatus comprising a cable connected to the ground at one end and having its opposite end remote from said one end and wound on a power-operated drum, a lighter-than-air craft connected to said cable at a portion spaced away from said opposite end and retaining said portion above the ground, a carriage mounted for movement along the cable, means for moving said carriage along the cable, and cable means depending from the carriage adapted to be connected to a load, said craft carrying at least part of the cable and said load.

8. Load-lifting apparatus as claimed in claim 7 in which the means for moving the carriage along the cable comprises a main line connected to one side of the carriage extending to and wound on a power-operated drum near one end of the cable, and a haulback line connected to the opposite side of the carriage and extending through a block near the opposite end of said cable, said haulback line being wound on a power-operated drum.

9. Load-lifting apparatus as claimed in claim 7 in which the cable means comprises a cable having one end wound on a power-operated drum mounted on said carriage.

10. Load-lifting apparatus comprising a carriage, a lighter-than-air craft connected to and lifting said carriage, means connecting one end of each of two cables to the carriage, said cables extending away from the carriage in opposite directions, means connecting the opposite ends of said cables to the ground, one end of each of said cables being wound on a power-operated drum whereby one cable may be reeled in and the other cable reeled out to shift the carriage toward either of said opposite ends of the cables, and cable means depending from the carriage adapted to be connected to a load, said craft carrying at least a part a part of said cables and of said load.

11. Load-lifting apparatus as claimed in claim 10 in which the cable means comprises a cable having one end wound on a power-operated drum mounted on said carriage.

12. Loading-lifting apparatus comprising a cable connected to the ground at one end and having its opposite end remote from said one end and wound on a power-operated drum, a carriage mounted for movement along the cable, a lighter-than-air craft connected to the carriage lifting the latter and at least a portion of the cable above the ground, means for moving said carriage along the cable, and cable means depending from the carriage adapted to be connected to a load, said craft carrying at least part of the cable and said load.

13. Load-lifting apparatus as claimed in claim 12 in which the means for moving the carriage along the cable comprises a second cable connected at the ends thereof to the ground adjacent the ends of said first-mentioned cable, and a power-operated drum mounted on the carriage, said second cable being wound at least once around said drum, whereby rotation of the drum moves the carriage along said first-mentioned cable.

14. Load-lifting apparatus as claimed in claim 13 in which the cable means comprises a cable having one end wound on a power-operated drum mounted on said carriage.

15. Load-lifting apparatus comprising a cable, means connecting the ends of the cable to the ground at spaced-apart points, a carriage mounted for movement along the cable, a lighter-than-air craft connected to the carriage, means for connecting a load to the carriage so as to be transported thereby, cable means connected to the carriage to move it in both directions along the cable, and power means connected to said cable means for moving the carriage along the cable, said craft at least partially supporting the load connected to the carriage as said carriage moves along the cable to transport the load.

16. Load-lifting apparatus comprising a cable, means connecting the ends of the cable to the ground at spaced-apart points, a carriage mounted for movement along the cable, a lighter-than-air craft connected to the carriage, a lifting cable suspended from the carriage and having a lower end adapted to be connected to a load, first power means connected to an opposite end of the lifting cable for lifting the load towards the carriage so as to be transported thereby, and second power means connected to said cable means for moving the carriage along the cable, said craft at least partially supporting the load connected to the carriage by said lifting cable as said carriage moves along the cable to transport the load.

17. Load-lifting apparatus comprising a cable, means connecting the ends of the cable to the ground at spaced-apart points, a carriage movably mounted on the cable, means connecting a load to the carriage so as to be transported thereby, a lighter-than-air craft connected to the cable, cable means connected to the carriage to move it in both directions along the cable, power means connected to the cable means for moving the carriage along the cable, said craft at least partially supporting the load as the carriage moves along the cable to transport the load.

18. Load-lifting apparatus as claimed in claim 17 in which the means connecting a load to the carriage comprises a lifting cable passing over a pulley carried by the carriage, one end of said lifting cable being adapted to be connected to a load, and power means connected to the opposite end of said lifting cable for lifting the load towards the carriage.

19. Load-lifting apparatus comprises a cable, means connecting the ends of the cable to the ground at spaced-apart points, a carriage mounted for movement along the cable, a lighter-than-air craft connected to the carriage, means for connecting a load to the carriage so as to be transported thereby, and means for moving said carriage in both directions along the cable, said craft at least partially supporting the load connected to the carriage as said carriage moves along the cable to transport the load.

References Cited by the Examiner
UNITED STATES PATENTS 291,691   1/1884   Clisham _____ 104—22

FOREIGN PATENTS 909,284   12/1945   France.
165,262   11/1958   Sweden.

SAMUEL F. COLEMAN, *Primary Examiner.*

CARL J. ALBRECHT, ERNEST A. FALLER,
*Examiners.*